(12) United States Patent
Gockel et al.

(10) Patent No.: US 7,308,435 B2
(45) Date of Patent: Dec. 11, 2007

(54) SYSTEMS, METHODS, AND SOFTWARE APPLICATIONS FOR MODELING THE STRUCTURE OF ENTERPRISES

(75) Inventors: Holger Gockel, Speyer (DE); Dirk Henrich, Wiesloch (DE); Joachim Puteick, Ubstadt-Weiher (DE); Gregor Rieken, Walldorf (DE); Martin Rogge, Östringen (DE); Dirk Rohdemann, Mühlhausen (DE); Reiner Wallmeier, Wiesloch (DE); Martin Zielonkowski, Freinsheim (DE); Heike Berger, Oberhausen (DE); Hendrik Geipel, Walldorf (DE); Matthias Schönecker, Forst (DE); Orestis Terzidis, Schwetzingen (DE)

(73) Assignee: SAP AG, Walldorf (DE)

( * ) Notice: Subject to any disclaimer, the term of this patent is extended or adjusted under 35 U.S.C. 154(b) by 425 days.

(21) Appl. No.: 10/844,373

(22) Filed: May 13, 2004

(65) Prior Publication Data

US 2005/0010549 A1    Jan. 13, 2005

Related U.S. Application Data

(60) Provisional application No. 60/535,539, filed on Jan. 12, 2004.

(51) Int. Cl.
*G06F 17/30* (2006.01)
(52) U.S. Cl. ........................................ 707/1
(58) Field of Classification Search ............. 707/1, 707/2, 100, 104.1, 10; 705/1; 709/224
See application file for complete search history.

(56) References Cited

U.S. PATENT DOCUMENTS

| 5,406,477 A | 4/1995 | Harhen |
| 6,341,289 B1 * | 1/2002 | Burroughs et al. ...... 707/104.1 |
| 2002/0133368 A1 * | 9/2002 | Strutt et al. ................ 705/1 |
| 2005/0086239 A1 * | 4/2005 | Swann et al. ............. 707/100 |

FOREIGN PATENT DOCUMENTS

| EP | 0841612 | 5/1998 |
| WO | WO 0114998 | 3/2001 |

OTHER PUBLICATIONS

U.S. Appl. No. 10/844,389, filed May 13, 2004, titled "Systems, Methods and Software Applications For Modeling the Structure of Enterprises."

* cited by examiner

*Primary Examiner*—Etienne Leroux
(74) *Attorney, Agent, or Firm*—Finnegan, Henderson, Farabow, Garrett & Dunner LLP

(57) ABSTRACT

A computer system is provided for modeling the structure of an enterprise comprising a first class of objects. An object of the class may represent an organizational unit of the enterprise. The class may comprise a method for assigning and/or deassigning to an object of the class at least one attribute from at least five types of attributes comprising: a first type describing a work to be performed by the unit; a second type describing a legal entity, which the unit represents; a third type describing a disciplinary or line management properties of the unit; a fourth type describing a financial responsibility of the unit; and a fifth type describing a location, which the unit represents. The system may further include means for assigning and/or deassigning to an object of said class at least one property depending on the assigned attribute.

35 Claims, 11 Drawing Sheets

Fig. 5

| UnitID | Unit Name | A1 | A2 | ... | A15 | A16 | Prop. | Assignm. | ... |
|---|---|---|---|---|---|---|---|---|---|
| 1 | N1 | Y | ... | | | | PROPID1 | ASMID1 | ... |
| 2 | N2 | | | ... | | | PROPID2 | ASMID2 | ... |
| 3 | N3 | | | Y | | | PROPID3 | ASMID3 | ... |
| 4 | N4 | | | Y | | | PROPID4 | ASMID4 | ... |
| 5 | N5 | | | Y | | | PROPID5 | ASMID5 | ... |
| 6 | N6 | | | Y | | | PROPID6 | ASMID6 | ... |
| 7 | N7 | | | Y | | | ... | | |
| 8 | N8 | | | Y | | | ... | | |
| 9 | N9 | | | Y | Y | Y | | | |
| 10 | N10 | | | Y | | | | | |
| 11 | N11 | | | Y | Y | Y | PROPID11 | | |
| 12 | N12 | | | Y | Y | Y | PROPID12 | | |
| ... | ... | | | ... | | | ... | ... | |
| n | | | | | | | | | |

Tab. 1

ATTRIBUTE PROPERTY Table

| Aspect | Att_N | Attribute_Descr | Prop_1 | Prop_2 | ... | Prop_N |
|---|---|---|---|---|---|---|
| Legal | A1 | Company Group | Group description | headquater | | |
| | A2 | Company | Trade register entry | Type of company | Address | Tax ID |
| Money | A3 | Segment | Product | | Name | ... |
| | A4 | Cost Center | Description | Liabilities | | ... |
| | A5 | Profit Center | Liabilities | | bookable | |
| Site | A6 | Source-of-Supply | Name | Opening time | ... | ... |
| | A7 | Target-of-Supply | Name | Opening time | ... | |
| | A8 | Ship-to-Location | Name | | ... | ... |
| | A9 | Ship-from-Loc. | ... | | | |
| | A10 | Production Loc. | Address | Geographical coordinates | Language Specifics | Country |
| | A11 | Inventory Loc. | Opening time | ... | ... | ... |
| People | A12 | Reporting-Line | | | | ... |
| Work | A13 | Sales | Product | Region | ... | ... |
| | A14 | Service | Work area | ... | ... | ... |
| | A15 | MRP | | ... | ... | ... |
| | A16 | Purchasing | Product | Region | ... | ... |

Fig. 5a

PROPID5

| Att_No | Prop_1 | Prop_2 | ... | Prop_N |
|---|---|---|---|---|
| A3 | Val_1_1 | Val_... | Val_... | Val_... |
| A4 | Val_... | Val_... | Val_... | Val_... |
| A5 | Val_... | Val_... | Val_... | Val_... |
| ... | Val_... | Val_... | Val_... | |
| ... | Val_... | Val_... | Val_... | Val_... |
| ... | Val_... | Val_... | Val_... | Val_... |
| AN5 | Val_... | Val_... | Val_... | |

Fig. 5b

Assignments to PROPERTIES

| Property Name | Hier_type | Inher_type | |
|---|---|---|---|
| Group name | standard | ... | ... |
| TR_no | ... | Local overrides | ... |
| Opening time | ... | ... | ... |
| Address | ... | Local overrides | ... |
| County | ... | ... | ... |
| ... | ... | ... | ... |

Fig. 5c

Types of assignments

| Type | Description |
|---|---|
| D | Default |
| L1 | belongs to |
| L2 | ... |
| ... | ... |
| S1 | works at |
| ... | ... |
| F1 | accounts to |
| ... | ... |
| P1 | manages company |
| ... | ... |
| W1 | undertakes smth. |
| W2 | fulfills smth. |
| ... | ... |

ASMID4

| AsmNo | AssDO | AssTOA |
|---|---|---|
| Assm1 | 2 | L1 |
| Assm2 | 7 | S1 |
| Assm3 | 8 | S1 |
| Assm4 | 9 | S1 |
| ... | ... | ... |
| Assm(N-1) | ... | ... |

Tab. 4

Positions

| PosID | Descr. | ... |
|---|---|---|
| Pos1 | Manager | ... |
| Pos2 | Bookkeeper | ... |
| Pos3 | ... | ... |
| ... | ... | ... |
| PosN | ... | ... |

Tab. 5

Persons

| PersID | Name | ... |
|---|---|---|
| Pers1 | Steve Miller | ... |
| Pers2 | ... | ... |
| Pers3 | ... | ... |
| ... | ... | ... |
| PersN | ... | ... |

Tab. 6

Fig. 6

Persons/Positions

| PersID | PosID |
|--------|-------|
| Pers1  | Pos1  |
| Pers8  | Pos2  |
| ...    | ..    |
| PersN  | ...   |

Tab. 7

Positions/Units

| PosID | UnitID | ToAtt | ToAsm |
|-------|--------|-------|-------|
| Pos1  | 9      | A1    | P1    |
| Pos2  | 11     | ...   | F1    |
| Pos2  | 12     | ...   | F1    |
| ...   | ...    | ...   | ...   |
| ...   | ...    | ...   | ...   |
| PosN  | ...    | ...   | ...   |

Tab. 8

Persons/Units

| PersID | UnitID | Attr | ToAsm |
|--------|--------|------|-------|
| Pers2  | 9      | A2   | W2    |
| Pers2  | 9      | A2   | W2    |
| Pers3  | 9      | A3   | W2    |
| Pers4  | 9      | A3   | W2    |
| ...    | ...    | ...  | ...   |
| PersN  | ...    | ...  | ...   |

Tab. 9

Fig. 7

SYSTEMS, METHODS, AND SOFTWARE APPLICATIONS FOR MODELING THE STRUCTURE OF ENTERPRISES

CROSS REFERENCE TO RELATED APPLICATIONS

This application claims the benefit of U.S. Provisional Patent Application Ser. No. 60/535,539, filed Jan. 12, 2004, EP Patent Application No. 04003696.4, filed Feb. 19, 2004, EP Patent Application No. 03010718.9, filed May 13, 2003, and EP Patent Application No. 04008853.6 filed Apr. 14, 2004, the disclosures of which are expressly incorporated herein by reference in their entireties.

DESCRIPTION OF THE INVENTION

1. Field of the Invention

The technical field of this invention is in the area of electronic data processing. More particularly, the invention relates to methods, computer program products and systems for modeling the structure of enterprises.

2. Background of the Invention

Modeling the structure of an enterprise, particularly an extended enterprise, with business software is a critical factor for implementation time and costs and the adequateness of the software implementation itself. An extended enterprise within the concept of this invention is the set of units, which treat a business process as if it would be processed within one company, even if borders of legal entities are crossed. Typically, business applications offer a set of organizational terms driven by software needs and customers have to identify units in their enterprise which come close to the terms the software offers. Unfortunately, this match is rarely very well and, if different applications are to be implemented, interaction between these different applications may become a critical problem. This is outlined in the following paragraph.

In many enterprises different software applications are installed for performing tasks in the areas of financial accounting, human resources, logistics, strategic enterprise management, customer relationship management etc. Although these different software applications may exchange data with each other via interfaces, usually none of these applications contains a complete and true image of the enterprise. Instead, a partial structure of the enterprise is mapped individually to each application according to its specific needs. Such a structure is usually implemented by means of a plurality of data objects. The resulting data are in language usage also referred to as master data. In other words: each application has its own master data of the enterprise. Once installed, such a system may work as long as no changes are made in the master data sets. However, if the structure or organization of the enterprise changes and this change has to be adapted to the master data sets of the applications, conflicts may arise if the master data sets can not be adequately adapted. This is frequently the case, because each set of master data is only a in individually and limited image of the structure of the enterprise. When performing such an adaptation, a lot of conversions have to be made, because interfaces between applications refer on different pools of entities and types of entities.

Another point is that one real world unit is frequently mapped to different types of data objects in the business software, e.g. a real world unit "division" is mapped to a data object of type "cost center" and to a type "division", which is different to "cost center". From a computer technical point of view this necessitates the provision of cross references and exception rules.

Thus, there is a need for systems, methods, software applications and/or data processing systems that provide a more efficient solution of at least parts of the problems described above. Further, it is desirable to provide a software application having a mechanism for modeling the structure of enterprises more efficiently.

The above description is based on the knowledge of the present inventors and not necessarily that known in the art.

SUMMARY OF THE INVENTION

In accordance with the present invention, as embodied and broadly described herein, a computer system for modeling the structure of an enterprise is provided. The computer system comprises a first class of objects, an object of the class representing an organizational unit of the enterprise. The class may comprise a method for assigning and/or deassigning to an object of the class at least one attribute from at least five types of attributes comprising: a first type describing a work to be performed by the unit; a second type describing a legal entity, which the unit represents; a third type describing a disciplinary or line management properties of the unit; a fourth type describing a financial responsibility of the unit; and a fifth type describing a location, which the unit represents. The system may further comprise means for assigning and/or deassigning to an object of the class at least one property depending on the assigned attribute.

In accordance with an embodiment of the invention, an object of the class may be suitable to represent each organizational unit of an enterprise. Thus, it is no longer necessary to map a single real world unit to different types of data objects. This avoids, from a technical point of view, the necessity of references and exception mechanisms and thus improves the maintainability of the system. The constructive overhead to maintain the integrity of the references is greatly reduced. Additionally, storage space is saved because of the smaller number of data objects necessary for modeling the structure.

Further types of attributes may be provided as required. However, the five types may be considered to be suitable and sufficient to completely model the structure of an enterprise with only one class of objects. An object may only bear a single type of attributes, but it may also bear at least two or at least three or at least four or at least five types of attributes Further classes of objects may be provided to represent positions, persons, moveable or immovable things, or to group objects of one or more classes.

By using the inventive system in data processing, it is now possible to provide a complete data model even of extended enterprises, which can provide support for cross application business processes. The inventive system allows a streamline implementation of business software and increases the result of the software implementation. The inventive system covers not only the classical company organization structure, i.e., the breakdown of work, but also the aspects of legal split up, financial responsibility, line management and spatial distribution. It introduces the basic notion of the unit that can be attributed by at least two aspects (types of attributes), which itself can carry individually hierarchies and relations. With the resulting network of first to fourth class data objects, which network may as well comprise first class objects bearing only one attribute or property, business questions can be answered by applying business rules to the network of objects in order to retrieve properties of a specific object or of the respective business unit. Integrity and suitability of the structure model can be assured by maintaining business constraints. The invention further has a technical advantage as a lot of conversions can be saved when changing the structure of the enterprise, because interfaces between different applications can now refer to a common pool of entities and types of entities, thereby reducing the total costs of ownership.

In accordance with another embodiment of the invention, a computerized method is provided for modeling the structure of an enterprise. The method may comprise: creating an object from a first class of objects; assigning an organizational unit of the enterprise to that object; assigning or deassigning to that object at one or more attributes of at least five types of attributes, the types of attributes comprising: a first type, describing a work to be performed by the unit, a second type describing a legal entity, which the unit represents, a third type describing a disciplinary or line management properties of the unit, a fourth type describing a financial responsibility of the unit and a fifth type describing a location, which the unit represents; and assigning one or more properties depending on the one or more assigned attributes.

Further aspects of the invention comprise data structures for first, second, third, fourth, fifth and sixth class data objects and of the networks of objects resulting there from, a computer program for performing methods according to the invention and its embodiments, a computer readable medium or computer program product comprising instructions for processing the inventive system and/or the data according to the inventive method and in its embodiments, respectively.

Additional objects and advantages of the various embodiments of the invention will be set forth in part in the description, or may be learned by practice of the invention. The objects and advantages of the embodiments of the invention will be realized and attained by means of the elements and combinations particularly pointed out in the appended claims. Embodiments of the invention are disclosed in the detailed description section and in the appended independent and dependent claims.

The various embodiments can include and/or exclude different aspects, features and/or advantages, where applicable. In addition, various embodiments can combine one or more aspects or features of other embodiments, where applicable.

It is understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

The accompanying drawings, which are incorporated in and constitute a part of this specification, illustrate embodiments of the invention and, together with the description, explain the principles of the invention. In the drawings.

FIG. 5 shows for illustration purpose an example of an implementation principle of the inventive first class objects with assigned attributes and properties;

FIG. 5a shows for illustration purpose examples of properties and attributes relating to the five types of attributes;

FIG. 5b shows for illustrating purpose an example of a table by which properties and values of properties referring to the assigned attributes are assigned to a first class object;

FIG. 5c shows for illustrating purpose an example of a table by which properties may be assigned properties assigned to first class data objects;

FIG. 6 shows for illustration purpose an example of an implementation principle of types of assignments, of assignments and of second and third class objects;

FIG. 7 shows for illustration purpose an example of an implementation principle of the assignments of second and third class objects.

DETAILED DESCRIPTION

Figure 1:
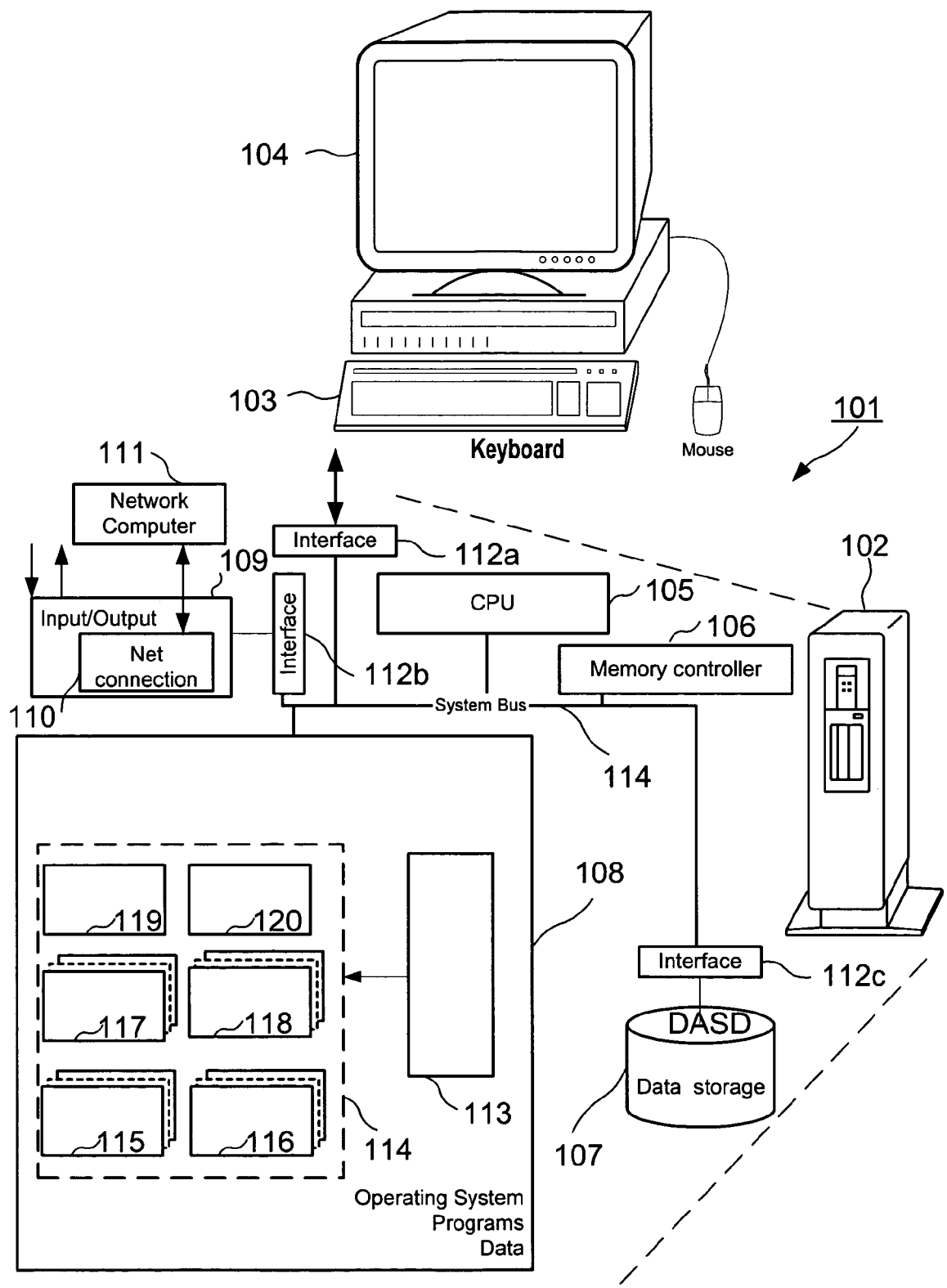
FIG. 1 is a schematic block diagram for illustrating an implementation of the invention within a computer system.

Within the concept of this specification, the terms used shall have their usual meaning in the context of the field of data processing unless defined otherwise. Particularly, a computer system broadly refers to any stand-alone computer such as a PC or a laptop or a series of computers connected via a network, e.g. a network within a company, or a series of computers connected via the Internet. Computer systems and programs may be closely related. As used herein, phrases, such as "the computer provides" and "the program provides or performs specific actions", "a user performs a specific action" are used to express actions by a computer system that may be controlled by a program or to express that the program or program module may be designed to enable the computer system to perform the specific action or to enable a user to perform the specific action by means of a computer system. The term "automatically" is not intended to exclude a user's interactions with the computer system in the course of processing.

Units—as used herein—broadly refer to building blocks of an enterprise or an extended enterprise including a partner structure, respectively. Data objects of the first class (="first class objects") represent such units. The types of attributes are hereinafter alternatively referred to as aspects. Accordingly, the first aspect is called "work aspect" (W), the second aspect is called "legal aspect" (L), the third aspect is called "people aspect" (P), the fourth aspect is called "money—" or "financial aspect" (F) and the fifth aspect is called "site aspect" (S). The L aspect describes an aspect of legal characteristics. The W aspect describes the distribution of labor (work breakdown). The P aspect describes the assignment of personnel. The F aspect describes the financial responsibility and the S aspect the spatial structure. From that description follows that those five aspects are different and independent of each other. Further, this set of five aspects has the advantage that it covers a vast majority of required areas for modeling enterprises. Therefore, this set may be considered to be complete. The five aspects further carry equal weight and can be treated fully symmetrical. This means that there is basically no leading aspect. The aspects carry each one or more attributes; to which a list of one or more properties is assigned. If an (one or more) attributes is assigned to a first class object, only the properties carried by this attribute may be assigned to the respective unit. In a specific use case, each attribute or property may be used to create a structure. This is one of the advantages of the inventive system that it is not necessary, compared to the state of the art, to define one hierarchy, e.g. a line management hierarchy, as a leading structure for the modeling of the enterprise. The attributes describe more specifically—compared to the aspects—what tasks within the enterprise structure are performed by the unit. By way of non-limiting example, such attributes may be: company group (L), company (L), segment (F), profit center (F), cost center (F), source-of supply (S), target-of-supply (S), ship-of-location (S), ship-from-location (S), production location (S), inventory location (S), reporting line (P), sales (W), service (W), material requirements planning (W), and/or purchasing (W). The related aspect is indicated in brackets.

Assignments between the first class objects (=units) can structure the units hierarchically. To each assignment, an assignment type may be assigned. By way of non-limiting example, an assignment type may be: standard type, financial type, legal type, location type, reporting line type and work type. In this way a hierarchy may be created between the assigned objects. A rule to perform hierarchical searches within the network of objects may be: if no type of assignment other than standard type is assigned, the assignment is of standard type. So, only exceptions from standard hierarchy need to be assigned.

In computer programming languages, the first, second, third and fourth class (data-) objects of the inventive system may be implemented by means of one or more lines of one or more tables, each line having one or more data fields. In object orientated programming such objects may be implemented by instances of classes. The assignments may be implemented by entries of IDs in tables as well. The Assignment of an assignment type may be implemented by an entry in an assignment table. Assignments may be directed or undirected, e.g., by entries in tables like "belongs to", "receives from" or "reports to". All assignments within the concept of this description can be descriptive. They can be filled with semantics, which can be interpreted by BAC software.

Accordingly, an embodiment of the system is characterized in that one or more attributes of one of said first or second or third or fourth or fifth type are selected from the group comprising of company group, company, segment, profit center, cost center, source-of supply, target-of-supply, ship-of-location, ship-from-location, production location, inventory location, reporting line, sales, service, material requirements planning, and purchasing.

According to the invention and its embodiments, one or more attributes may be assigned to each type of attribute. The term "attribute" shall—within the concept of this disclosure—not be interpreted in a technical sense, i.e., as a non-key field in a database table, but refers to all kind of information that can be attached to an aspect to enrich the description of its business meaning. The same principle applies to the term "property"

This enables enterprise modeling. Attributes of the L aspect may bear properties, which contain a description of the legal entity, e.g. by its name or entry in the public register of companies, the sales tax ID, address etc. Attributes of the W aspect may bear properties, which e.g. contain a description of what has to be done (activity), what objects are to be used to do it (area) or in which system it is to be done. Attributes of the P aspect may bear properties, which contain descriptions of e.g. whether or which manager is responsible for performing salary review, training, performance feedback, confirmation of leave requests, etc. Attributes of the F aspect may bear properties, which contain descriptions of the financial responsibility by specifying which finance technical key figures should flow into the results definition of the respective unit, e.g., a cost center. Attributes of the S aspect may bear properties, which contain information on the location of the respective unit, e.g., address, geographic coordinates, language specific descriptions, federal state, public holiday calendar, etc. Structuring an enterprise does not just involve the preparation of a simple list of units but also the documentation of their relationships to each other. Differing attributes and/or properties of the same unit may be entered in the hierarchy differently. It may therefore be advantageous if the hierarchy is carried by the attributes and/or properties and not by the units. Different types of hierarchies may be maintained in parallel.

The delegation of commercial tasks may be described using an explicit hierarchy amongst the attributes or properties of the work aspects. Example: If a company produces goods, it has to buy raw material, for what presumably a purchasing division will be responsible.

A particular quantity of legal entities represents firms. They are on the same level with the same value. Above this level there may be a network of subgroups.

The breakdown of financial responsibility may be made using an explicit hierarchy. It crosses the IAS-segments and the profit centers, and ends in the basic units representing cost centers, projects, orders and activities.

The spatial inclusion of sites may be mapped by an explicit hierarchy under attributes of the site aspects. If sub-characteristics are given in the same way as for financial aspects, clear requirements of the type "a warehouse is always at a site" are possible.

The reporting hierarchy may be mapped by an explicit hierarchy, e.g. "is line manager of" between the people aspects.

An embodiment of the system is characterized by a second class of objects representing positions in the enterprise. The second class objects being assigned to one or more first class objects.

Such second class objects (=positions) are useful, because in real life, work breakdown and assignment of people is pragmatic and rapidly changing. But other parts of the enterprise structure are more static and individual persons address well established sets of job responsibilities. In this case a notion of a "should be"—person is useful. The representation of such a "should be"—person is a position. The position may be designed to serve as an indirection between a person and a set of job responsibilities. Since all aspects may be treated symmetrically, positions may substitute persons in all assignments to aspects and/or attributes of units. Positions offer indirection between persons and aspects of units. But this is not exclusively. There is full freedom to use indirection and free assignment on demand. That means that one person may "just do the job" and be assigned to a position that describes all of its assignments to aspects of units. In the same model another person may be assigned directly everywhere and is not assigned to a position at all. And a third person may be assigned to a position and may undertake (be assigned to) an additional job responsibility not included in the position or have an explicitly stated different cost assignment.

An embodiment of the system is characterized by a third class of objects representing natural persons of the enterprise, said third class objects being assigned to one or more attributes of one or more of the first class objects and/or to one or more second class objects or to one or more first class objects.

Due to such third class objects (=persons) natural persons and their sometimes complex description may be referenced from the model of the enterprise. Persons may have assignments to positions and/or attributes and/or properties of units. Persons may undertake one or more job responsibilities of a work aspect. These job responsibilities may also be connected to several types of work. Persons may belong to a legal entity. A particular affiliation could be a managing director or someone acting on his behalf. Persons may be assigned to an attribute of the F aspect, e.g., a cost center of a unit. Persons may be assigned to an attribute of the S aspect, e.g., a location, what may mean that the default location of the person is the assigned location. Persons may further be assigned to an attribute of the P aspect, e.g., as an employee or as a responsible (disciplinary) manager. The assignments are advantageously drawn to aspects of a unit and not to the unit itself. Then the assignments are free to differ from attribute to attribute. For each attribute or property a corresponding abstract responsibility may be created, which automatically requires a corresponding person responsible. Hence, no cost center without manager, no division of labor without labor administrator(s) (foreman, manager), no firm without a chairman, etc.

An embodiment of the system is characterized by a sixth class of objects representing movable or immovable things of the enterprise, one or more sixth class objects being assigned to one or more first class objects.

These fourth class objects may also be implemented by on or more lines of one or more tables.

An embodiment of the system is characterized by one or more rules for defining one or more evaluation algorithms to retrieve attributes or types of attributes or properties of one or more of the first class objects. Such rules are hereinafter referred to as business rules.

In the important special case of classic organization, a considerable amount of redundancy may arise without additional model elements. Within a classic organization at least W, P and F aspects fall together and L and S aspects are hierarchically in sync with others. The redundancy may arise when the three hierarchies for W, P and F are stored redundantly. Furthermore, a sales employee, for example, must be assigned five times though this is redundant (at least three times to the same structure element). All legal assignments are aligned with the P hierarchy, etc.

It is therefore useful to allow more complex rules for evaluating the knowledge contained in the model than the simple access to descriptions or relationships. A suitable means of doing this is a defaulting mechanism in the form of configurable evaluation methods, the business rules. This concept goes beyond the straight inheritance along a hierarchy, to the extent that hierarchies may themselves be transferred.

A business rule describes a search path through the network of persons, positions, aspects of units and the various relationships between them. This includes the assignment of persons to aspects, the hierarchies amongst the aspects and the implicit "identity" relation between different aspects of the same unit.

Business rules may advise to follow another hierarchy, if the desired one is not maintained, to read another assignment of a person, if the assignment asked for is not specified, to follow some hierarchy up to a certain level to find the value of a property, if not assigned locally (this is close to inheritance), to read another property instead, if the information is not provided in the property asked for, etc.

The business rules may be inserted into each other. That means, if they are implemented e.g. as subprograms, that these subprograms may call each other.

For each request to the enterprise structure model by a user a business rule how to find the answer may be created.

Examples include the following:

If a people hierarchy is maintained between two units with P and F aspects attributes and properties, but F aspect type information is required, the people hierarchy may be used if no other explicit financial assignment is affected.

If a person undertakes a job responsibility depending on W aspect information (attributes and properties), whose unit also carries F aspect information (such as cost centre) or a people aspect (department) then this person ought to be assigned to the cost centre or department. If this involves a leadership function, this should also affect the financial and people leadership responsibility. This applies if no other explicit financial or people assignment for the person is implemented (which would "overwrite" the default provided by the business rule).

If different financial and work assignments are affected, then a business rule needs to be used to determine whether the two assignments may be used as a default for the financial assignment. Alternatively the model may be flagged as inconsistent or incomplete at this point.

A business rule to find the public holiday calendar for a detailed site utilizing a business rule that implements inheritance of the public holiday calendar downwards along the S-hierarchy A business rule that lets the employer of an employee object as default in the only firm it does work for. Finding the firm, which may be uniquely defined, may be implemented by calling another (presumably already implemented) business rule, that navigates from a job responsibility to a L-aspect property (i.e., the firm that runs the. W-aspect).

A business rule that finds the "federal state" of the official residence ("office") of an employee by first looking directly to the employee ("contract") if anything is specified. If not, the rule may navigate from employee to person (one way is the newly introduced relation above) further to a W-aspect property for which the person undertakes a job responsibility (the path may possible branch here). Then the rule may apply another rule to find the site of a W-aspect property utilizing various hierarchies and identification via unit identity. If the investigation of the network described above results in a unique "federal state", the rule delivers this "federal state" as its result. Otherwise it may throw an exception because the structure model may be inconsistent.

An embodiment of the system is characterized by one or more rules for the limitation of the assignments and of relations amongst first, second, third and fourth class objects. Such rules are hereinafter referred to as business constraints.

It is also be advantageous to limit freedom of modeling by placing rules, the business constraints. Such rules may be of general business meaning and introduce restrictions of possible "real worlds" into the modeling activity. For example a business constraint may be to place a profit centre not below a cost centre in the financials responsibility hierarchy.

On the other hand, a given business software working on a data model based on the inventive system may have functional limitations (intended or grown) that needs assumptions about what the model contains. For example, a site object that keeps stock may need a unique assignment to an owning firm.

A straightforward special case will be the constraint: "Business Rule XY should always terminate returning a unique result". There may be, however, more intricate limitations that will need more language elements to be described.

An embodiment comprises a system, in which one or more first class objects are assigned to an object of a fifth class and wherein a one or more rules are assigned to that fifth class object. The rules may be rules defining business processes of the enterprise.

The usefulness of this embodiment is explained by way of the following non-limiting exemplary scenario.

By means of business software systems according to the state of the art, an extended enterprise comprising a set of legally independent companies may be modeled in a computer system by assigning a plurality of different data objects to each of the companies. Each of the companies may have a data object "financial accounting", by means of which the financial bookkeeping of the respective company is modeled. One of the tasks of the companies which are to be modeled in the software system may be, for example, the process of dunning customers. This process may be implemented according to the state of the art by defining one or more rules and assigning such rules to each of the respective data objects. An example of such a rule may be: automatically sending a dunning letter to the customer if the invoice has not been paid after four weeks. A variation of that rule may be to send the dunning letter after two weeks. Or: if the company is located in country A, apply procedure A1, if located in B, apply procedure B1. Further, a set of companies may apply the first rule, another set the second rule. The implementation in the business software system is to assign to each financial accounting data object the rule which applies to the respective company. This procedure has two disadvantages. The first one appears when operating the system and when the rules are to be adapted according to changes in enterprise policy. Then, the rules have to be adapted for each data object. The second disadvantage appears when installing the business software. The software supplier usually does not know the structure of the enterprise and consequently can not supply the structure of the financial accounting data objects. These objects have to be customized. This in turn has the consequence that the set of rules, which determine the dunning behavior of the system, can not be supplied as well. They have to be customized.

This situation changes when using the embodiment described above. Since a set of rules may be assigned to a (fifth) data object and that data object may be assigned to one or more of the first class data objects, it is possible to change the (dunning) behavior of a plurality of financial accounting data objects by only amending one set of rules. Furthermore, it is now possible for the software supplier to predefine one or more (fifth) data objects and one or more sets of one or more rules and to provide these predefined data together with the software to the customer. When installing the software and customizing first class data objects, one or more of these first class data objects may be assigned to a predefined fifth data object thereby being provided with a predefined set of rules. This reduces the complexity of the data structure and saves installation and maintenance time and costs. It is clear to one of ordinary skill that this preferred embodiment can be applied to any type of business process.

An embodiment comprises a system, in which a hierarchy is assigned to a first class data object. This hierarchy may reflect the organizational structure of the enterprise. The hierarchy may alternatively or additionally reflect the distribution of work within the enterprise.

This embodiment has the advantage that one hierarchy may be applied to all attributes and properties. Exceptions from the hierarchy in specific aspects may be defined separately.

Another embodiment comprises a system with a plurality of electronic data objects for modeling the structure of an enterprise, each electronic data object representing a unit of the enterprise and having one or more data fields, comprising: each electronic data object having at least five data fields for assigning at least one attribute of said five types of attributes to said data object. Further on, at least sixteen further data fields may be available for assigning to the unit one or more of the properties depending on the assigned attribute.

Still another embodiment of the invention comprises a fourth class of objects representing responsibilities in the enterprise, the fourth class objects being assigned to one or more first and/or second class objects. Thereby, the responsibilities describe a task to be performed by the unit or position represented by the first or second class data object.

In accordance with another embodiment, an inheritance type may be assigned to one or more of the properties. By way of a non-limiting example, the inheritance type can be selected from the group consisting of local overrides inherited, inherited overrides local, additive, and no inheritance.

If, for example, the inheritance type of the property "country" is "local overrides inherited", then the value of the property "country" in first class objects in lower levels of the hierarchy has the value of the object of the next higher level unless it is specifically entered.

Another embodiment of the invention comprises one or more templates for creating a network of first class objects, the templates consisting of first class objects having a preconfigurable set of attributes and/or properties.

Still another embodiment of the invention comprises one or more rules for defining one or more evaluation algorithms to retrieve properties and/or attributes and/or types of attributes of one or more of the first class objects.

Another embodiment comprises one or more rules for the limitation of assignments and of relations amongst first, second, third, fourth, fifth and/or sixth class objects.

In another embodiment of the invention, a method is provided that comprises assigning a first class object to one or more other first class objects.

In yet another embodiment of the invention, a method is provided that comprises assigning one or more attributes to each type of attributes.

According to another embodiment of the invention, a method is provided that comprises creating one or more objects of a second class, the second class objects representing positions in the enterprise and assigning the second class objects to one or more first class objects.

An embodiment of the inventive method may also comprise creating one or more objects of a third class representing natural persons of the enterprise and assigning the third class objects to one or more second class objects.

An embodiment of the inventive method may also comprise creating one or more objects of a fourth class representing responsibilities in the enterprise and assigning the fourth class objects to one or more first class objects.

An embodiment of the inventive method can also comprise creating one or more rules for defining one or more evaluation algorithms to retrieve attributes or properties of one or more of the first class objects.

An embodiment of the inventive method may also comprise creating one or more rules for the limitation of assignments and of relations amongst first, second, third and fourth class objects.

An embodiment of the inventive method may also comprise assigning an assignment type to an assignment.

An embodiment of the inventive method may also comprise assigning one or more first class objects to an object of a fifth class and assigning one or more rules to operate on the assigned first class objects to that fifth class object.

An embodiment of the inventive method may also comprise assigning a hierarchy to a first class object.

An embodiment of the inventive method may also comprise creating one or more objects of a sixth class representing movable or immovable things of the enterprise and assigning the fourth class objects to one or more first class objects.

In one embodiment, the inventive method is enabled for use in software for supporting business processes.

In another embodiment, the method comprises prompting a user whether a template should be used as the basis for creating a first or second or third or fourth class object.

An embodiment the invention may comprise, when having chosen a template, letting appear a wizard/input assistant allowing the custom parameters to be filled, and then branches direct to person assignment.

The embodiments are useful if, for example, a user wishes that a sales office is represented by a unit with the following properties:

it (the unit) has exactly the work, financial, site and people aspect properties
 it always belongs to our sales company (legal)
 the following responsibilities depend on the work aspects attributes
 sale of products from the division <listen-variable> to customers in the federal state <festwert-variable>
 organization of the sale for this work
 carrying out clerical work for all employees working at this site
 the financial aspect attribute is a cost centre managed by the same person who organizes the sale (work or responsibility)
 the people aspect has full responsibility for personnel for employees who depend on the sales responsibility (work or responsibility)
 the personnel responsibility for the clerical staff falls to the head office of the company for a service department
 the employees who assume responsibility for the sales office all have their administrative office there (site).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices (storage means) for storing data, e.g., magnetic, magneto-optical disks, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer system having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or haptic feedback; and input from the user can be received in any form, including acoustic, speech, or haptic input.

Reference will now be made in detail to the principles of the invention by explaining the invention on the basis of a data processing process, examples of which are illustrated in the accompanying drawings. Examples, mentioned therein, are intended to explain the invention and not to limit the invention in any kind.

Referring now to FIG. 1, a computer system 101 comprising computer 102 and operating means 103, 104, in accordance with a preferred embodiment of the present invention is illustrated. Those skilled in the art will appreciate that the method and apparatus of the present invention apply equally to any computer system, regardless of whether the computer system is a complicated multi-user computing apparatus or a single user device such as a personal computer or workstation. Computer 102 suitably comprises a processor 105, main memory 108, and a memory controller 106, an auxiliary storage interface 112c, a general input/output interface 112b and a terminal interface 112a, all of which are interconnected via a system bus 114. Note that various modifications, additions, or deletions may be made to computer system 101 illustrated in FIG. 1 within the scope of the present invention such as the addition of cache memory or other peripheral devices. FIG. 1 is presented to simply illustrate some of the salient features of computer system 101.

Processor 105 performs computation and control functions of computer system 101, and comprises a suitable central processing unit (CPU). Processor 105 may comprise a single integrated circuit, such as a microprocessor, or may comprise any suitable number of integrated circuit devices and/or circuit boards working in cooperation to accomplish the functions of a processor. Processor 105 may suitably execute (object-oriented) computer programs within main memory 108.

Auxiliary storage interface 112c allows computer system 101 to store and retrieve information from auxiliary storage devices, such as magnetic disk (e.g., hard disks or floppy diskettes) or optical storage devices (e.g., CD-ROM). One suitable storage device is a direct access storage device (DASD) 107. As shown in FIG. 1, DASD 107 may be a hard disk drive which may read programs and data from a hard disk. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Further examples of signal bearing media include: recordable type media such as floppy disks and CD ROMS, and transmission type media such as digital and analogous communication links, including wireless communication links.

Memory controller 106, through use of a processor is responsible for moving requested information from main memory 108 and/or through auxiliary storage interface 112c to processor 105. While for the purposes of explanation, memory controller 106 is shown as a separate entity; those skilled in the art understand that, in practice, portions of the function provided by memory controller 106 may actually reside in the circuitry associated with processor 105, main memory 108, and/or auxiliary storage interface 112c.

Terminal interface 112a allows system administrators and computer programmers to communicate with computer system 101, normally through monitor 104, keyboard 103, mouse, trackball and the like or through programmable workstations. Although the system 101 depicted in FIG. 1 contains only a single main processor 105 and a single system bus 114, it should be understood that the present invention applies equally to computer systems having multiple processors and multiple system buses. Similarly, although the system bus 114 of the preferred embodiment is a typical hardwired, multidrop bus, any connection means that supports directional communication in a computer-related environment could be used.

Input/output interface 112b allows computer system 101 via processor 105 to communicate with general input/output means 109, including a net connection 110, for sending and/or receiving data, e.g. for a net connection with one or more further computer systems 111, or for sending or receiving of data to or from other parties. A plurality of computer systems like computer system 101 can be connected via the net connection 110 in the form of a network. In such a case, the network computers 111 can be used as further input/output means, including the use as further storage locations.

In an embodiment, memory 108 suitably includes an operating system, programs and data, particularly a software application 113, a system 114 of (data) objects comprising a plurality of first class objects 115, one or more second class objects 116, one or more third class objects 117, one or more fourth class objects 118, a set of business rules 119 and a set of business constraints 120, which all may be held in memory 108 for being accessed or applied by program 113.

It should be understood that for purposes of this application, memory 108 is used in its broadest sense, and may include Dynamic Random Access Memory (DRAM), Static RAM (SRAM), flash memory, cache memory, etc. While not explicitly shown in FIG. 1, memory 108 may be a single type of memory component or may be composed of many different types of memory components. For example, memory 108 and CPU 105 may be distributed across several different computers that collectively comprise system 101. It should also be understood that programs in memory 108 can include any and all forms of computer programs, including source code, intermediate code, machine code, and any other representation of a computer program.

The operating system provides the basic functionality that controls the computer system 101. Operating system can comprise any suitable operating system, such as IBM's OS/400, OS/2, Microsoft's Windows, Java and the various flavors of UNIX. The database 117 provides the mechanism for persistently storing object data in the computer system 101, and can be any suitable, preferably relational database such as those available from IBM, Oracle or Microsoft.

Those skilled in the art will appreciate that more than one of the mentioned processors may work in parallel in a computer system.

Figure 2:
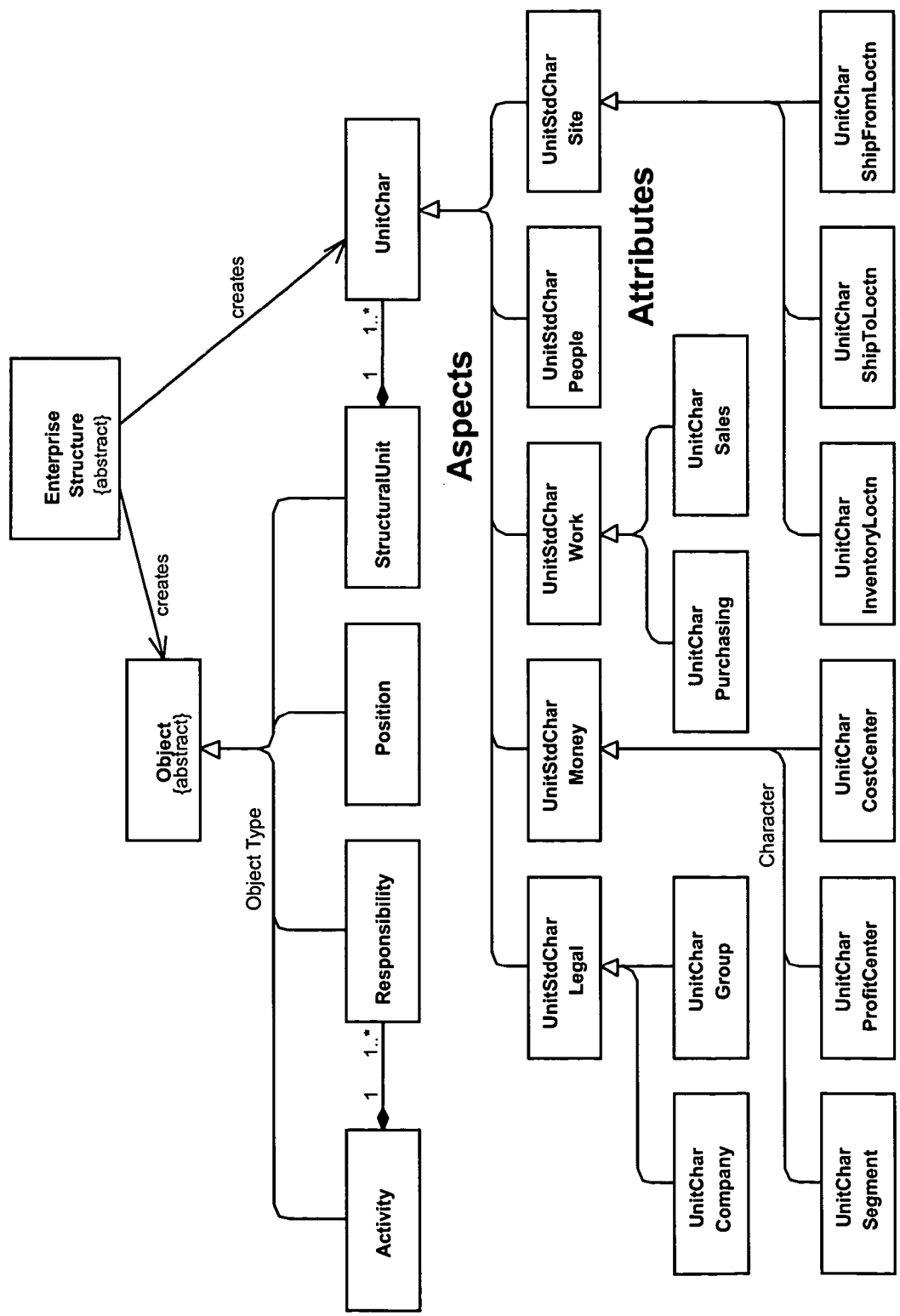
FIG. 2 is a schematic UML class diagram for illustrating a possible implementation principle of the invention.

FIG. 2 shows a UML class diagram describing a possible implementation of the invention. The figure shows a class of first class objects (StructuralUnit) comprising data fields for an identifier (id) and a name. A unit may be assigned to attribute (UnitChar) one or more of the 5 types of attributes (aspects, UnitStdChar), which are shown—and may be implemented—as classes in the UML diagram. The UnitChar class for the People aspect is not shown. A connection having a filled rhombus means that an object (e.g. UnitChar) exists only in the context with the respective other object (e.g. StructuralUnit) and the "1" indicates that it exists only in the context of a single work aspect 207. The "1.*" at the connection line 213 indicates that any number of respective objects may be assigned to the other object.

In addition, Position and Responsibility and an Activity class are assigned to the StructuralUnit class via an abstract object class.

Figure 3:
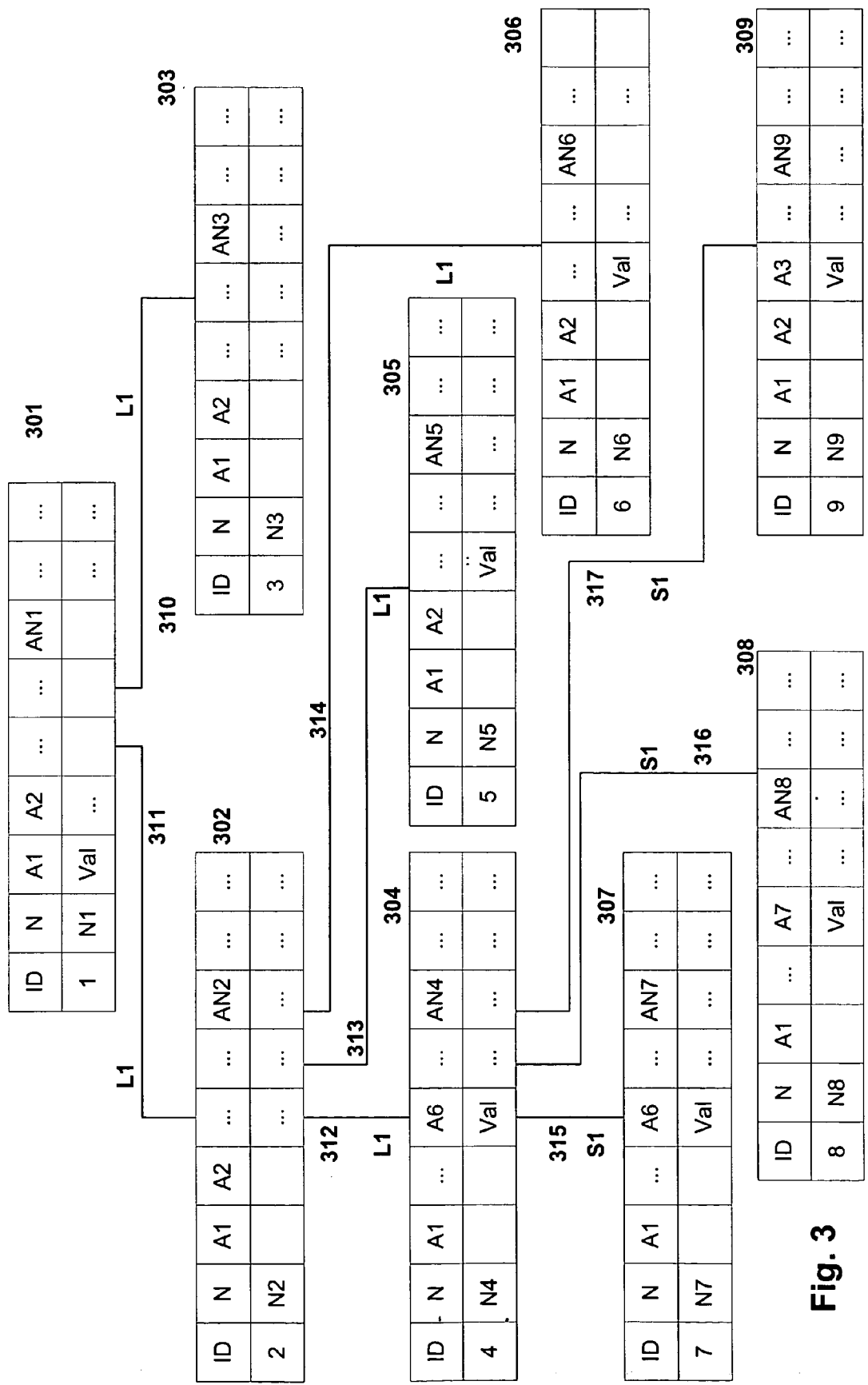
FIG. 3 is an exemplary block diagram for illustrating the principle of an application of an inventive system on an extended enterprise.
Figure 4:
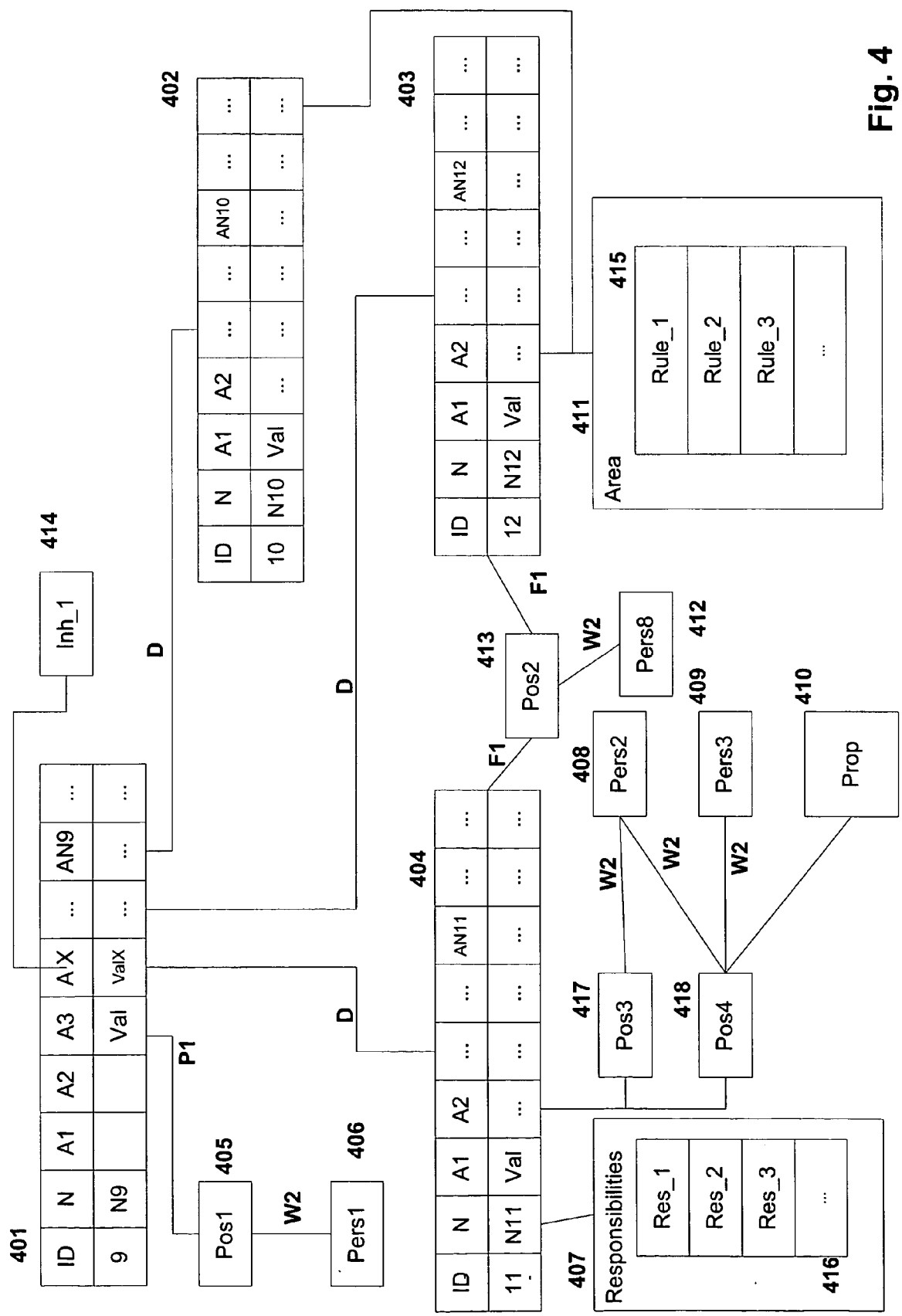
FIG. 4 is a continuation of the exemplary embodiment of FIG. 3.

FIGS. 3 to 7 show an example of an application of the inventive system on an enterprise group, which sells and repairs a certain good. FIGS. 3 and 4 show the structure of the enterprise group in the form of a block diagram containing first class objects representing the units of the enterprise group as well as their relationships. FIGS. 5 to 7 show an example of an implementation of the data model of that enterprise group by means of tables 1 to 9, which tables may be implemented by means of a data base system, particularly a relational database system.

The enterprise group is represented by a first class object 301, the structure of which is shown in table 1 of FIG. 5. Each line of table 1 represents a first class object, abbreviated as unit in the following section. Each unit has a data field for an identifier (UnitID) and a name (UnitName). Further, sixteen data fields A1 to A16 are available for assigning an attributes (aspect) to the unit. Such an assignment may be given, if for example a "Y" is entered in the respective data field. Unit 301 has the ID 1, the name N1 and an A1 attribute. The meaning of these data can be seen from the ATTRIBUTE PROPERTY table in FIG. 5a. The table shows an example of an assignment of a number of N properties to 16 attributes named A1 to A1. A descriptive name of the attributes is contained in the fields of the Attribute_Desc column. It is clear from the table that a property, e.g., "Name" can be assigned to one or more attributes. It can also be seen that the number N of properties assigned to an attribute may vary from attribute to attribute. Unit 301 represents the leading entity of the enterprise group. Each unit further has a data field "Prop.", which contains a reference to a further table, in which the attributes of the respective aspect of the respective unit are defined. In the example of unit 5 the Prop field references to a table PROPID5 shown in FIG. 5b. By means of such a table values of properties 1 to N may be assigned to each unit. As a further example, unit 11 has properties of attributes A2 and A3 assigned.

The units as defined by table 1 further compromise a data field "Assignm." by means of which are the units may be assigned to the respective unit. The Assignm field references to a table, in which the assignments of a specific unit to other units are contained. An example of such an assignment table is table 4. Table 4 shows exemplary the assignments of unit 4. The assignment field of unit 4 references to the assignment table ASMID4 shown in table 4. Each line of table 4 contains one assignment. An assignment consists of an assignment number AsmNo, the identifier of the assigned unit and a type of assignment. In case of the system having N units, N−1 assignments may be established to other units. In the example of table 4 unit 4 has four assignments and is assigned to units 2, 7, 8 and 9. The first assignment is of a type L1, the second to fourth assignments are of a type S1. The types of assignments are described by means of table 3. Each line of table 3 defines one type of assignment. An assignment comprises a type name data field "type" and a description data field "description". Accordingly, the first assignment of unit 4 is of the type "belongs to".

From FIG. 3 it can be seen that two units 302, 303 are assigned to unit 301 by assignments 311, 310. Both assignments are of the type "belongs to". Unit 302, 303 represent subsidiaries named N2, N3 belonging to the enterprise group named N1. Depending on the properties of the respective subsidiaries, unit 303 may have all aspects assigned, unit 302 only four. Starting from unit 302, the structure of the enterprise further branches to units 304, 305 and 306. These three units are assigned to unit 302 by assignments 312, 313 and 314, each of the type "belongs to". Units 305 and 306 represent branches of the legal entity represented by unit 302 and therefore have no own legal (A1, A2) attribute. Unit 304 represents a location of unit 302 at a specific place and therefore may have only site (S) attributes.

Starting from unit 304, the structure of the enterprise further branches to units 307, 308 and 309, which units are assigned to units 304 by assignments 315, 316 and 317. These assignments are all of the type S1, "works at" (compare table 3), what means that they are located at the site defined in unit 304. Units 307 and 308 represent depots of unit 302 and therefore have only S attributes. Units 309 represents a branch of unit 302 having own work organization, line management hierarchy, financial responsibility and location and may therefore have the respective four aspects.

In FIG. 4, unit 309 of FIG. 3 is explained in more detail as unit 401. The branch 401 of the subsidiary 302 has three units 402, 403 and 404 assigned. Unit 404 represents a repair division, unit 403 a purchasing division. Both units are assigned to unit 401 by an assignment of type W1, "undertakes something", and attribute of the W aspect, what means that both units are part of the work organization of unit 401. Both units further have own financial responsibility and therefore carry additionally attributes of F aspect. Unit 402 only represents a depot of unit 401 and therefore carries only an S attribute. Its connection to unit 401 is of type "works at".

In FIG. 4, a position 405 is assigned to unit 401. A position is a data object, which may be implemented as a line of a table as described in table 5 of FIG. 6. A position comprises a data field for an ID, a data field for a description and, optionally, further data fields. The assignment of a position to an aspect of a unit may be implemented by means of a table as shown in table 8 of FIG. 7. Therein, one line represents one assignment. A first data field "PosID" contains the ID of the position to be assigned. A second data field "UnitID" contains the ID of the unit which carries the aspect the position is to be assigned to. A third data field "ToAtt" contains, if applicable, the attribute to which the position is assigned. A fourth data field "ToAsm" contains the type of assignment, which may be taken from table 3 of FIG. 6. As can be seen from table 8, a single position may be assigned to different aspects of different units and one aspect of a unit may have different position is assigned. This is shown by a position 413, which is assigned to units 404 and 403. The assignment type of position 405 to unit 401 is P1, "manages company", what means that this position is for a person who manages the unit of the enterprise represented by unit 401. The assignment of position 413 is of type F1, "accounts to", what came mean that this position is financed by units 404 and 403. Consequently, a person 406 is assigned to position 405. A person is a data object representing a natural person. Again, such data object may be implemented as a line of a table as described in table 6 of FIG. 6. Therein a person comprises a data field "PersID" for an ID, a data field "name" for the name of the respective person and, optionally, further data fields for further information about the person. The assignment of persons to positions may be implemented by means of a table as shown in table 7 of FIG. 7. One person may be assigned to one or more positions and one position may have one or more persons assigned. Additionally, a type of assignment may be assigned to the assignment of persons to positions in the same way as pointed out above. In FIG. 4 the assignment of person 406, "Steve Miller", to position 405, company manager, is of type W2, fulfills, what means that Steve Miller is the manager of the unit of the enterprise represented by unit 401. Further, a person 412 is assigned to position 413 by a type W2 assignment as well.

A number of responsibilities 407 Res_1 to Res_n is assigned to the W aspect via table 416.

As further shown in FIG. 4, a second person 408 is assigned to two positions 417, 418 (Pos3 and Pos4) of unit 404. A third person 409 is assigned only to position 418. These assignments of persons to attributes may be implemented by means of a table as shown in table 7 of FIG. 7. If a person shall be assigned to an attribute, this may be implemented by means of a table like table 9 in FIG. 7. Therein, one line represents one assignment. A first data field "PersID" contains the ID of the person to be assigned. A second data field "UnitID" contains the ID of the unit, which carries the respective attribute. A third data field "Attr" contains a link to the data field in which the target attribute of the assignment is stored. Additionally, a type of assignment may be assigned to the assignment of persons to attributes in the same way as already pointed out above. In table 9 this is implemented by a data field "ToAsm". There from it follows that the assignment of person 409 is of type "fulfills", what means that in "real life" person 409 performs repair orders in the repair division. Further, a one or more properties 410 depending on the attributes assigned to the unit are assigned to position. This may be implemented in table 8 of FIG. 7 by means of a further column containing links to tables in which the properties are entered.

FIG. 4 further shows a data object 411 (area) to which units 403 and 402 are assigned. Area 411 contains a set 415 of rules 1 to n, which are applicable to all units of the area.

The table in FIG. 5c shows how further properties like hierarchy types or inheritance types or other properties can be assigned to the properties defined by the attributes. Such a table may be queried by applications, which operate on the properties, e.g., business rules or constraints.

Figure 8:
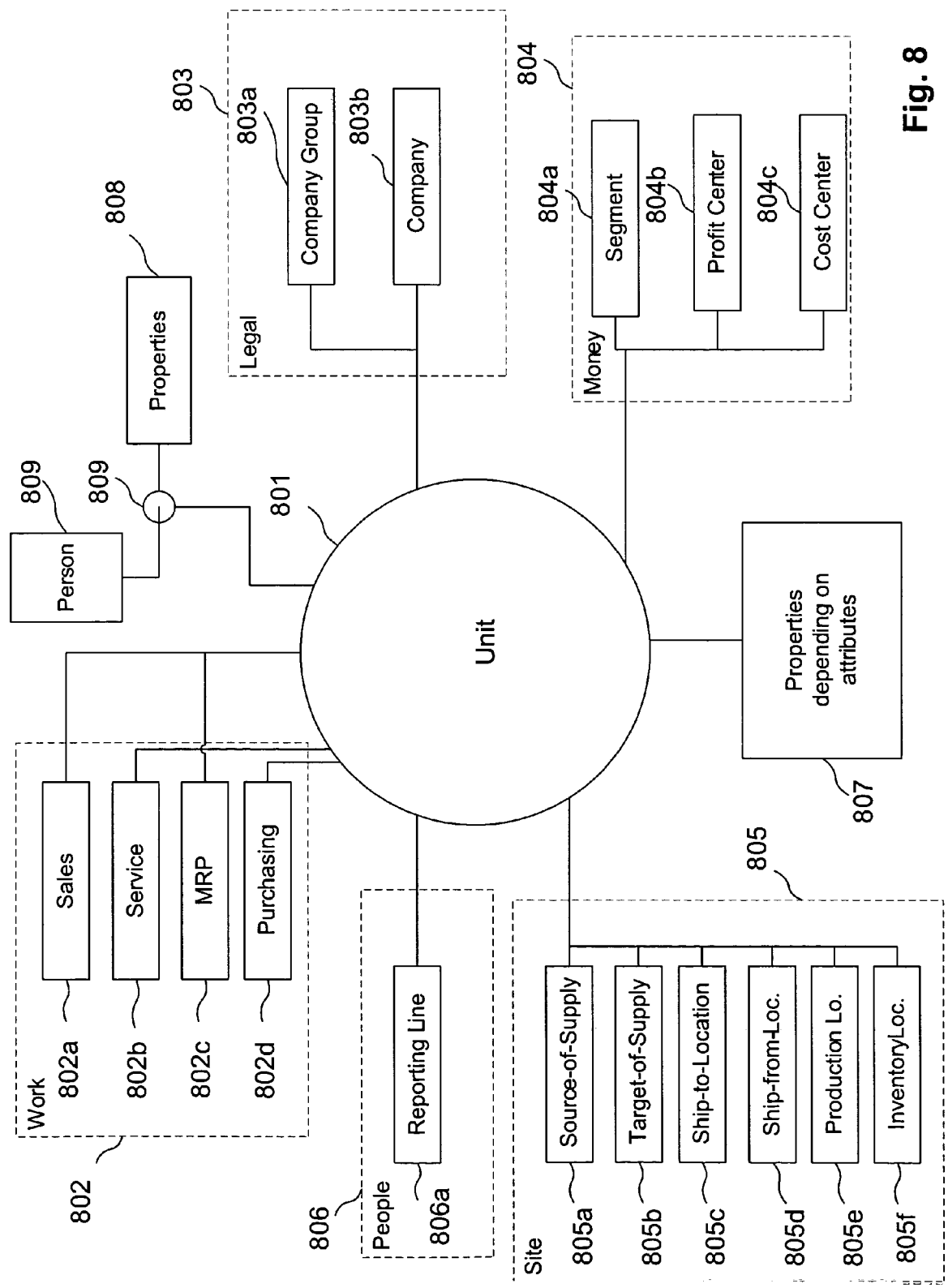
FIG. 8 shows for illustration a block diagram of a first class object with assigned attributes and properties.

FIG. 8 illustrates the principles of the invention by way of a non-limiting more general example of a first class object 801 to which attributes 80Xa of five types of attributes (aspects) 802 (W), 803 (L), 804 (F), 805 (S) and 806 (P) are assigned. One or more attributes 802a (to W), 803a (to L), 804a (to F), 805a (to S) and 806a (to P) is assigned to each aspect, respectively. Further, a second class data object 809 representing a position is assigned to unit 801. Position 809 bears a list 808 of one or more properties depending on the attributes assigned to unit 801. A third class data object 810 representing a person is assigned to position 809.

Attributes 802a describe the work to be performed by the unit that is represented by first class object 801. Single attributes may describe an activity, a work area, responsibilities or the like.

Attributes 803*a* describe the legal entity to which the unit, which is represented by first class object 801. Single attributes may describe a corporation, an entry in a (trade) register, address information, tax ID or the like.

Attributes 804*a* describe the financial responsibility to which the unit, which is represented by first class object 801, belongs. Single attributes may describe cost centers and their hierarchy.

Attributes 805*a* provide a location description of the unit, which is represented by first class object 801. Single attributes may describe address information, geographical coordinates, language-specifics or the like.

Attributes 806*a* describe the disciplinary responsibility of the unit, which is represented by first class object 801. Single attributes may describe a line management hierarchy.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer system for modeling the structure of an enterprise, the system comprising:
   a first class of objects,
   an object of said first class, representing an organizational unit of the enterprise, wherein said first class comprises a method for assigning and/or deassigning to objects of said first class, at least one attribute based on a group of attribute types, the group of attribute types comprising:
   a first type describing work to be performed by the unit, wherein the work describes a distribution of labor;
   a second type describing a legal entity, which said unit represents;
   a third type describing disciplinary or line management properties of the unit;
   a fourth type describing a financial responsibility of the unit; and
   a fifth type describing a location, which said unit represents,
   wherein the system further comprises means for assigning and/or deassigning to objects of said first class at least one property depending on the assigned at least one attribute, in order to model the structure of the enterprise.

2. The system of claim 1, wherein one or more attributes of one of said first or second or third or fourth or fifth type are selected from the group consisting of company group, company, segment, profit center, cost center, source-of-supply, target-of-supply, ship-of-location, ship-from-location, production location, inventory location, reporting line, sales, service, material requirements planning, purchasing.

3. The system of claim 1, wherein the object of said first class is assigned to one or more furthers objects of said first class.

4. The system of claim 3, wherein an assignment type is assigned to an assignment between two objects of said first class.

5. The system of claim 4, wherein the assignment type is selected from the group consisting of standard type, financial type, legal type, location type, reporting line type and work type.

6. The system of claim 1, wherein a hierarchy is assigned to one or more objects of said first class.

7. The system of claim 1, further comprising:
   a second class of objects;
   an object of said second class representing positions in the enterprise, the object of said second class being assigned to one or more objects of said first class.

8. The system of claim 7, further comprising:
   a third class of objects;
   an object of said third class representing natural persons of the enterprise, one or more objects of said third class being assigned to one or more objects of said second class.

9. The system of claim 8, further comprising:
   a fourth class of objects:
   an object of said fourth class representing responsibilities in the enterprise, the object of said fourth class being assigned to one or more objects of said first and/or second class.

10. The system of claim 9, wherein the responsibilities describe:
- a task to be done by the unit represented by the object of said first class; and/or
- an activity to be done by the unit represented by the object of said first class; and/or
- that the responsibilities refer to a context.

11. The system of claim 1, wherein one or more objects of said first class are assigned to an object of a fifth class and wherein one or more rules to operate on the assigned objects of said first class are assigned to the object of said fifth class.

12. The system of claim 1, further comprising an object of a sixth class of objects representing movable or immovable things of the enterprise, one or more objects of said sixth class being assigned to one or more objects of said first class.

13. The system of claim 1, wherein an inheritance type is assigned to one or more of the properties.

14. The system of claim 13, wherein the inheritance type is selected from the group consisting of local overrides inherited, inherited overrides local, additive, no inheritance.

15. The system of claim 1, further comprising one or more templates for creating a network of objects of said first class, said templates consisting of objects of said first class having a preconfigurable set of attributes and/or properties.

16. The system of claim 1, further comprising one or more rules for defining one or more evaluation algorithms to retrieve at least one of properties, attributes, and types of attributes of one or more of the first objects.

17. The system of claim 1, further comprising one or more rules for the limitation of assignments and of relations amongst first, second, third, fourth, fifth and/or sixth objects.

18. A computerized method for modeling the structure of an enterprise comprising:
- creating an object from a first class of objects;
- assigning an organizational unit of the enterprise to the object;
- assigning or deassigning to the object at one or more attributes of at least five types of attributes, the types of attributes comprising:
  - a first type describing a work to be performed by the unit, wherein the work describes a distribution of labor,
  - a second type describing a legal entity, which said unit represents,
  - a third type describing a disciplinary or line management properties of the unit,
  - a fourth type describing a financial responsibility of the unit and
  - a fifth type describing a location, which said unit represents;
- assigning one or more properties depending on the one or more assigned attributes, in order to model the structure of the enterprise.

19. The method of claim 18, wherein one or more attributes of one of said first or second or third or fourth or fifth type are selected from the group consisting of company group, company, segment, profit center, cost center source-of supply, target-of-supply, ship-of-location, ship-from-location, production location, inventory location, reporting line, sales, service, MRP, purchasing.

20. The method of claim 18, further comprising assigning a first class object to one or more other first class objects.

21. The method of claim 18, further comprising assigning one or more attributes to each type of attributes.

22. The method of claim 18, further comprising creating one or more objects of a second class, the second class objects representing positions in the enterprise and assigning said second class objects to one or more first class objects.

23. The method of claim 18, further comprising creating one or more objects of a third class representing natural persons of the enterprise and assigning said third class objects to one or more second class objects.

24. The method of claim 18, further comprising creating one or more objects of a fourth class representing responsibilities in the enterprise and assigning said fourth class objects to one or more first class objects.

25. The method of claim 18, further comprising creating one or more rules for defining one or more evaluation algorithms to retrieve attributes or properties of one or more of the first class objects.

26. The method of claim 18, further comprising creating one or more rules for the limitation of assignments and of relations amongst first, second, third and fourth class objects.

27. The method of claim 18, further comprising assigning an assignment type to an assignment.

28. The method of claim 18, further comprising assigning one or more first class objects to an object of a fifth class and assigning one or more rules to operate on the assigned first class objects to that fifth class object.

29. The method of claim 18, further comprising assigning a hierarchy to a first class object.

30. The method of claim 18, further comprising creating one or more objects of a sixth class representing movable or immovable things of the enterprise and assigning said fourth class objects to one or more first class objects.

31. One or more electronic data objects creatable or created by the method according to claim 18.

32. An electronic data structure for modeling the structure of an enterprise, creatable or created by the method according to claim 18.

33. A computer readable medium comprising program instructions for performing the method of claim 18 in case said instructions are loaded into a computer system and executed.

34. A computer readable medium comprising one or more data objects according to claim 31.

35. A computer program product comprising a computer readable medium according to claim 33.

* * * * *